United States Patent
Clark et al.

(10) Patent No.: US 7,349,903 B2
(45) Date of Patent: Mar. 25, 2008

(54) APPARATUS, SYSTEM, AND METHOD FOR AN ALTERNATE LOCK FACILITY CONNECTION PATH

(75) Inventors: Brian Dow Clark, Tucson, AZ (US); Juan Alonso Coronado, Tucson, AZ (US); Beth Ann Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 10/990,630

(22) Filed: Nov. 17, 2004

(65) Prior Publication Data

US 2006/0106823 A1    May 18, 2006

(51) Int. Cl.
    *G06F 71/30*    (2006.01)
(52) U.S. Cl. .............................. 707/8; 709/239; 710/38
(58) Field of Classification Search ................ 707/8; 709/239; 710/38
    See application file for complete search history.

(56) References Cited

U.S. PATENT DOCUMENTS

| | | | | |
|---|---|---|---|---|
| 5,493,724 A | * | 2/1996 | Cohn et al. ............... | 710/38 |
| 6,073,209 A | * | 6/2000 | Bergsten .................. | 711/114 |
| 6,253,274 B1 | * | 6/2001 | Boonie et al. ............ | 710/200 |
| 6,625,747 B1 | | 9/2003 | Tawil et al. .............. | 714/6 |
| 6,704,812 B2 | | 3/2004 | Bakke et al. ............. | 710/38 |
| 6,766,359 B1 | * | 7/2004 | Oliveira et al. .......... | 709/213 |
| 2002/0145981 A1 | | 10/2002 | Klinker et al. ........... | 370/244 |
| 2003/0016624 A1 | | 1/2003 | Bare ....................... | 370/217 |

* cited by examiner

*Primary Examiner*—Wilson Lee
*Assistant Examiner*—Andalib F Lodhi
(74) *Attorney, Agent, or Firm*—Kunzler & McKenzie

(57) ABSTRACT

An apparatus, system, and method are disclosed for an alternate lock facility connection path. A request module receives a connection request to establish redundant connection paths between a control unit and a host. A primary connection module establishes a first connection path between the control unit and the host through a first communication channel. An alternate connection module establishes a second connection path between the control unit and the host through a second communication channel. A detection module detects a failure of the first connection path. A redirection module redirects communication between the control unit and the host through the second connection path upon detection of a failure of the first connection path.

26 Claims, 7 Drawing Sheets

APPARATUS, SYSTEM, AND METHOD FOR AN ALTERNATE LOCK FACILITY CONNECTION PATH

BACKGROUND OF THE INVENTION

1. Field of the Invention

This invention relates to alternate connection paths and more particularly relates to maintaining a redundant alternate connection path for lock attention data.

2. Description of the Related Art

A transaction processing system such as an airline reservation system, a credit card transaction processing system, or the like typically comprises a plurality of host systems or hosts such as mainframe computers, servers, and the like. The hosts access data in a common data store. The data store typically includes a plurality of storage devices such as hard disk drives, data caches, and the like. The hosts may access the data in the storage devices through a control unit. For example, a first host may request data from the control unit, and the control unit may retrieve the data from one or more storage devices. The first host may also transmit data to the control unit, and the control unit may write the data to one or more storage devices.

Each host communicates with the control unit through a connection path. Each connection path typically includes one or more physical communication channels such as a digital electronic communication bus, a digital optical communication bus, or the like. In addition, each connection path may include one or more logical control blocks, addresses, and the like for coordinating the transmission of digital messages between the host and the control unit.

Before the first host accesses data through the control unit, the first host typically requests that the data be locked. For example, the first host may request that specified data such as one or more rows in a data table, one or more tracks of a hard disk drive, or the like be locked. If the first host is granted the lock, the first host may access the specified data without a second host being allowed access the specified data. The first host has exclusive access to the specified data until the first host releases the lock.

If the second host requests a lock on the specified data while the first host holds the lock on the specified data, the second host will be not receive the lock. Instead the second host's lock request will be placed in a lock request queue. The second host may wait to process transactions until receiving the lock. After the first host has released the lock on the data, the control unit grants the next lock request in the lock request queue for the specified data. For example, after the first host releases the lock, the control unit may grant a lock on the specified data to the second host if the second host's request is the next request in the lock request queue. The control unit will transmit lock attention data to the second host to notify the second host of the granted lock request. The lock attention data may include a holder notification specifying the data for which the second host holds the lock. Upon receipt of the lock attention data, the second host may access the specified data.

Unfortunately, when a connection path between a host and the control unit fails, the host will not receive the lock attention data granting the host a lock on the specified data. As a result, the host will not access the specified data and release the lock on the specified data for another host. The host may not receive the lock attention data until the failed connection path is discovered and an alternate connection path is established. Until the alternate connection path is established, the lock request queue may continue to grow as additional hosts request locks on the specified data. Each requesting host may be idle while waiting for the lock attention data granting the lock on the specified data, slowing the performance of the transaction processing system. In addition, if the lock request queue grows to a sufficient length, the transaction processing system may require an extreme recovery action such as rebooting the system to allow transaction processing to resume.

From the foregoing discussion, it should be apparent that a need exists for an apparatus, system, and method that establish a redundant alternate connection path in addition to the primary connection path for communicating lock attention data to a host. Beneficially, such an apparatus, system, and method would assure the host received a holder notification even if the primary connection path fails.

SUMMARY OF THE INVENTION

The present invention has been developed in response to the present state of the art, and in particular, in response to the problems and needs in the art that have not yet been fully solved by currently available connection path methods. Accordingly, the present invention has been developed to provide an apparatus, system, and method for maintaining connection paths that overcome many or all of the above-discussed shortcomings in the art.

The apparatus for an alternate connection is provided with a logic unit containing a plurality of modules configured to functionally execute the necessary steps of receiving a connection request, establishing a first connection path, establishing a second connection path, detecting a failure of the first connection path, and redirecting communications through the second connection path. These modules in the described embodiments include a request module, a primary connection module, an alternate connection module, a detection module, and a redirection module.

The request module receives a connection request to establish redundant connection paths between a control unit and a host. In one embodiment, the connection paths communicates lock attention data between the control unit and the host. The lock attention data may comprise a holder notification notifying the host that the host has been granted a lock on specified data.

The primary connection module establishes a first connection path between the control unit and the host through a first communication channel. The first connection path may comprise one or more logical control blocks, addresses, and the like for transmitting digital messages between the host and the control unit. In one embodiment, the first communication channel comprises a physical communication channel such as a digital electronic communication bus, a digital optical communication bus, or the like.

The alternate connection module establishes a second connection path between the control unit and the host through a second communication channel. Although the control unit and the host may primarily communicate lock attention data through the first connection path, the second connection path is recognized by the host and may be used to communicate the lock attention data if the first connection path fails.

The detection module detects a failure of the first connection path. For example, the first communication channel of the first connection path may fail, resulting in the failure of the first connection path. The detection module may detect the failure by being notified of a communication channel failure and determining each connection path that employs the failed communication channel. In an alternate embodiment, the detection module may periodically test each connection path to detect a failed connection path.

The redirection module redirects communication between the control unit and the host through the second connection path if the first connection path failure is detected. The host continues to receive lock attention data through the second connection path, preventing the degradation of system performance or system failure.

A system of the present invention is also presented for an alternate connection path. The system may be embodied in a transaction processing system. In particular, the system, in one embodiment, includes a plurality of hosts, a plurality of communication channels, a storage device, and a control unit comprising a request module, a primary connection module, an alternate connection module, a detection module, a redirection module, an initialization module, and a notification module.

The control unit accesses the data of the storage device for the hosts. In one embodiment, the control unit accesses a plurality of storage devices. The hosts communicate with the control unit through a plurality of connection paths. Each connection path comprises at least one communication channel. Each communication channel transmits digital messages between the host and the control unit. One or more connection paths may employ one or more communication channels. In particular, each connection path may transmit lock attention data between the control unit and the hosts.

The request module receives a connection request to establish redundant connection paths between the control unit and a first host. The primary connection module establishes a first connection path between the control unit and the first host through a first communication channel. The alternate connection module establishes a second connection path between the control unit and the host through a second communication channel. The detection module detects a failure of the first connection path. The redirection module redirects communication between the control unit and the first host through the second connection path if the first connection path failure is detected.

In one embodiment, the notification module notifies the first host that the lock attention data is communicated through the second connection path. For example, if the first communication channel fails, the detection module will preferably detect the failure. The notification module then notifies the host that the lock attention data will be communicated through the second connection path and the redirection module redirects communications between the control unit and the first host through the second connection path.

In one embodiment, the initialization module communicates the connection request to the request module when one or more hosts are initialized. The initialization module may also communicate the connection request when the control unit is initialized. The system establishes a redundant second connection path that is used to maintain communications if a first connection path fails.

A method of the present invention is also presented for an alternate connection path. The method in the disclosed embodiments substantially includes the steps necessary to carry out the functions presented above with respect to the operation of the described apparatus and system. In one embodiment, the method includes receiving a connection request, establishing a first connection path, establishing a second connection path, detecting a failure of the first connection path, and redirecting communications through the second connection path.

A request module receives a connection request to establish redundant connection paths between a control unit and a host. A primary connection module establishes a first connection path between the control unit and the host through a first communication channel. An alternate connection module establishes a second connection path between the control unit and the host through a second communication channel. A detection module detects a failure of the first connection path. A redirection module redirects communication between the control unit and the host through the second connection path if the first connection path failure is detected.

Reference throughout this specification to features, advantages, or similar language does not imply that all of the features and advantages that maybe realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention establishes redundant first and second connection paths between a control unit and a host. Each connection path employs a unique communication channel. The present invention also detects a failure of the first connection path and redirects communications through the second connection path, reducing the performance degradation of a system resulting from the host not receiving lock attention data. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
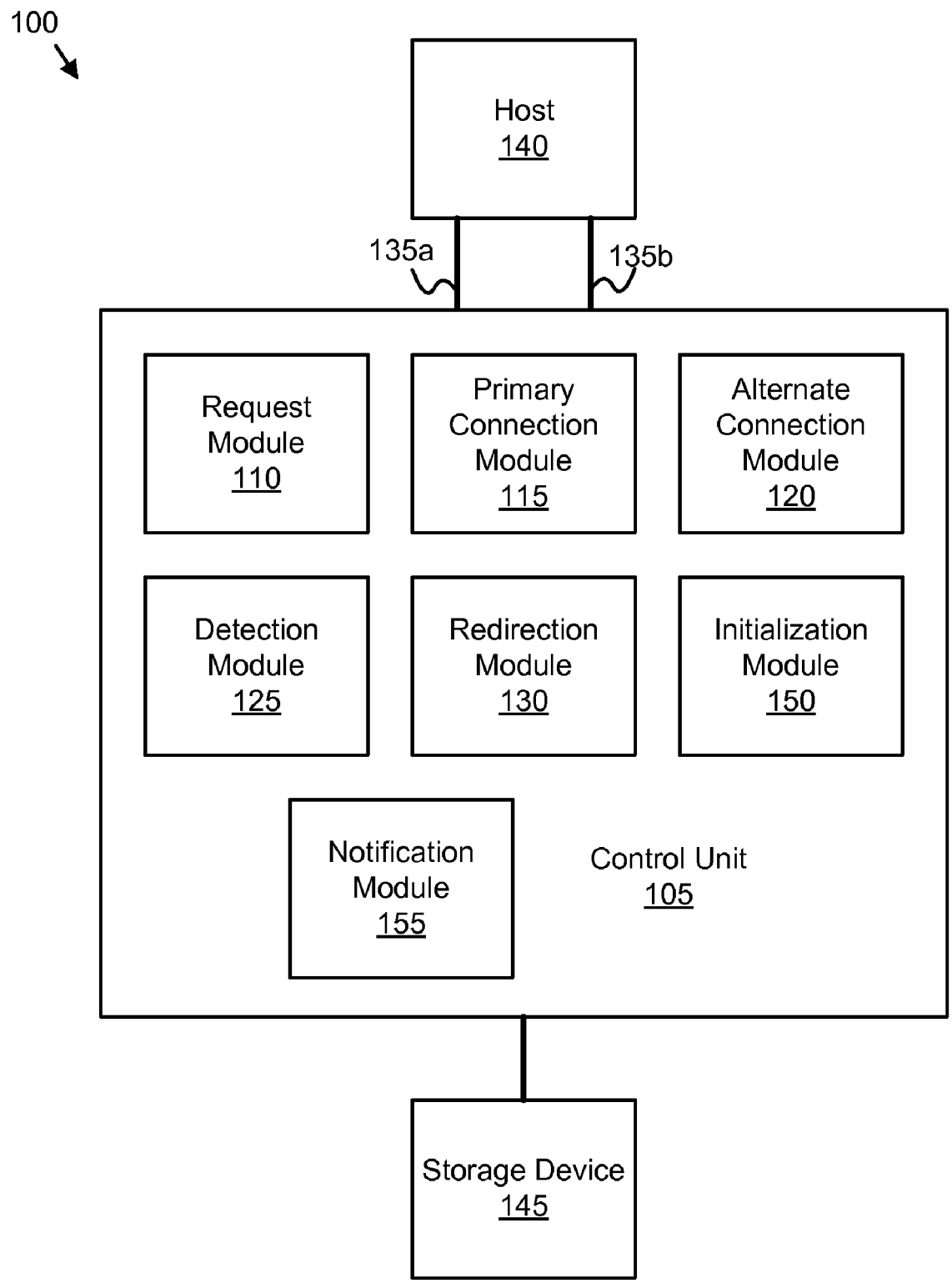
FIG. 1 is a schematic block diagram illustrating one embodiment of an alternate path system in accordance with the present invention.

FIG. 1 is a schematic block diagram illustrating one embodiment of an alternate path system 100 in accordance with the present invention. The system 100 includes a host 140, one or more communication channels 135, a storage device 145, and a control unit 105 comprising a request module 110, a primary connection module 115, an alternate connection module 120, a detection module 125, a redirection module 130, an initialization module 150, and a notification module 155. Although the system 100 is depicted with one host 140, two communication channels 135, one control unit 105, and one storage device 145, any number of hosts 140, communication channels 135, control units 105, and storage devices 145 may be employed.

In one embodiment, the host 140 processes transactions comprising data. The host 140 reads data from and writes data to the storage device 145. The host 140 may be a mainframe computer, a server, or the like. In a certain embodiment, the host is a z/390 mainframe computer manufactured by International Business Machines Corporation ("IBM") of Armonk, N.Y. The control unit 105 accesses the data of the storage device 145 for the host 140.

The storage device 145 may be one or more hard disk drive, a redundant array of independent drives, an optical storage drive, a magnetic tape drive, a data cache, or the like. In one embodiment, the control unit 105 accesses a plurality of storage devices 145. In a certain embodiment, the control unit 105 comprises the storage device 145. The control unit 105 may also include a data cache. In a certain embodiment, the control unit 105 is a DS6000 or DS8000 manufactured by IBM of Armonk, N.Y.

The host 140 communicates with the control unit 105 through a connection path. Each connection path comprises at least one communication channel 135. In addition, each connection path may comprise one or more logical ports, control blocks, addresses, and the like for transmitting digital messages between the host 140 and the control unit 105. In one embodiment, each communication channel 135 is configured as a physical communication channel such as a digital electronic communication bus, a digital optical communication bus, or the like. Each communication channel 135 transmits digital messages between the host 140 and the control unit 105.

In one embodiment, the connection path communicates lock attention data between the control unit 105 and the host 140. The lock attention data may comprise a holder notification notifying the host 140 that the host 140 has been granted a lock on specified data. The host 140 and the control unit 105 may establish a specified connection path such as a first connection path comprising the first communication channel 135a for communicating the lock attention data from the control unit 105 to the host 140.

For example, the host 140 may request a lock for specified data on the storage device 145 from the control unit 105. The control unit 105 may respond by communicating lock attention data through the first connection path that includes the first communication channel 135a. The lock attention data may include a holder notification configured to notify the host 140 that the host 140 holds the requested lock on the specified data. Upon receiving the lock attention data, the host 140 may access the specified data.

Unfortunately, if the first connection path fails, the host 140 is unable to receive the lock attention data through the first connection path. In the past, the host 140 would have to wait to receive the lock attention data until an alternate connection path was established, often after a costly delay. The present invention establishes redundant first and second connection paths between the control unit 105 and the host 140 and communicates the lock attention data through the second connection path if the first connection path fails.

The request module 110 receives a connection request to establish redundant connection paths between the control unit 105 and the host 140. The primary connection module 115 establishes a first connection path between the control unit 105 and the host 140 through the first communication channel 135a. The alternate connection module 120 establishes a second connection path between the control unit 105 and the host 140 through the second communication channel 135b.

The detection module 125 detects a failure of the first connection path. For example, the detection module 125 may detect a failure of the first connection path caused by a failure of the first communication channel 135a. The redirection module 130 redirects communication between the control unit 105 and the host 140 through the second connection path if the first connection path failure is detected. The second connection path is recognized by the host 140 so that there is no delay in receiving the communication.

In one embodiment, the initialization module 150 communicates the connection request to the request module 110 when the host 140 is initialized. The initialization module 150 may also communicates the connection request to the request module 110 when the control unit 105 is initialized. Although the control unit 105 is depicted as comprising the initialization module 150, the initialization module 150 may also reside in other elements of the system 100 including but not limited to the host 140.

In one embodiment, the notification module 155 notifies the host 140 that the lock attention data is communicated through the second connection path. The system 100 establishes the redundant second connection path recognized by the host 140 that is used to maintain communications between the control unit 105 and the host 140 if the first connection path fails.

Figure 2:
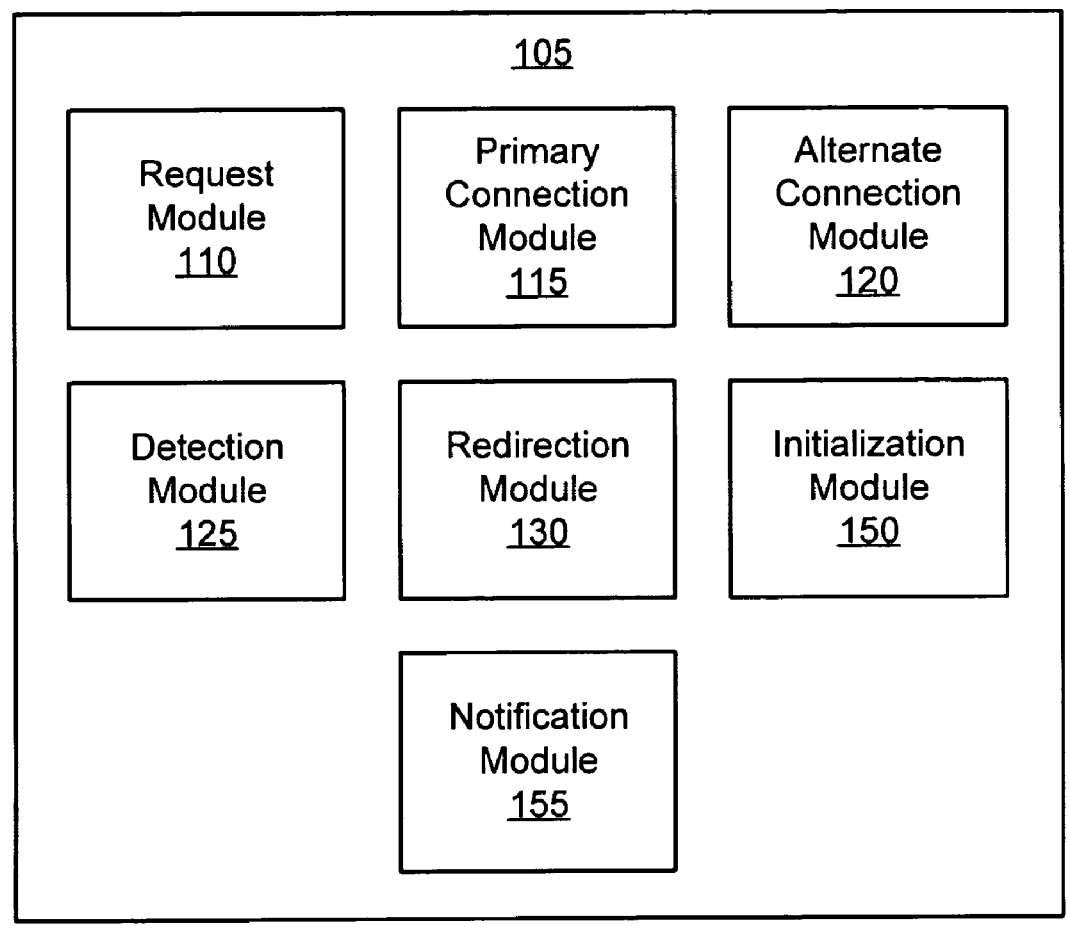
FIG. 2 is a schematic block diagram illustrating one embodiment of an alternate path apparatus of the present invention.

FIG. 2 is a schematic block diagram illustrating one embodiment of an alternate path apparatus 200 of the present invention. The apparatus 200 includes a request module 110, a primary connection module 115, an alternate connection module 120, a detection module 125, and a redirection module 130. In one embodiment, the apparatus 200 also includes an initialization module 150 and a notification module 155.

The request module 110 receives a connection request to establish redundant connection paths between a control unit 105 and a host 140. In one embodiment the host 140 transmits the connection request to the request module 110. In a certain embodiment, the connection request directs that the connection path will be used to transmit data including but not limited to lock attention data.

In one embodiment, the initialization module 150 communicates the connection request when the host 140 is initialized. In a certain embodiment, the host unit 140 is initialized during an initial program load wherein one or more software programs are loaded on to the host 140 and executed by the host 140. In an alternate embodiment, the initialization module 150 communicates the connection request when the control unit 105 is initialized. The initialization of the control unit 105 may include the initial microcode load wherein one or more software programs are loaded to the control unit 105 and executed by the control unit 105.

The primary connection module 115 establishes a first connection path between the control unit 105 and the host 140 through a first communication channel 135a. The control unit 105 employs the first connection path to communicate the lock attention data to the host 105. The first connection path may comprise one or more logical ports, control blocks, addresses, and the like for communicating digital messages between the host 140 and the control unit 105. For example, a first control block may specify a logical destination for lock attention data. The logical destination may include one or more modules to detect the receipt of the lock attention data, notify a software program that the lock attention data was received, and communicate the lock attention data to the software program.

The alternate connection module 120 establishes a second connection path between the control unit 105 and the host 140 through a second communication channel 135b. The host 140 recognizes the second connection path as the host 140 requested the second connection path. The first and the second communication channels 135a, 135b are each distinct, separate communication channels. The failure of the first communication channel 135a will not affect the ability of the second communication channel 135b transmit communications between the control unit 105 and the host 140.

The second connection path may also comprise one or more logical control blocks, addresses, and the like for communicating digital messages between the host 140 and the control unit 105. For example, the second connection path may include a second control block specifying the logical destination for lock attention data. Although the control unit 105 may primarily communicate lock attention data through the first connection path to the host 140, the second connection path may be used to communicate the lock attention data if the first connection path fails.

In one embodiment, the alternate connection module 120 shares one or more software programs with the primary connection module 115. For example, the primary connection module 115 and the alternate connection module 120 may each employ the same software program to establish a specified connection path, the primary connection module 115 specifying the first connection path and the alternate connection module 115 specifying the second connection path.

The detection module 125 detects a failure of the first connection path. For example, the first communication channel 135a of the first connection path may fail, resulting in the failure of the first connection path. The detection module 125 may detect the failure by being notified of a communication channel 135 failure. In response to the notification of the communication channel 135 failure, the detection module 125 may determine the connection path that employs the failed communication channel 135. In an alternate embodiment, the detection module 125 may periodically test each connection path to detect a failed connection path.

In one embodiment, the notification module 155 notifies the host 140 that the lock attention data will be communicated through the second connection path. For example, the notification module 155 may transmit a message to the host 140 directing the host 140 to listen for the lock attention data at the second connection path. The notification module 155 may also notify the host 140 that the first connection path must be re-established. In one embodiment, the notification module 144 notifies the host 140 through the second connection path.

The redirection module 130 redirects communication between the control unit 105 and the host 140 through the second connection path if the first connection path failure is detected. In one embodiment, the redirection module 130 directs the control unit 105 to communicate the lock attention data through the second connection path. In an alternate embodiment, the redirection module 130 receives the lock attention data and communicates lock attention data to the host 140 through either the first connection path or the second connection path if the first connection path failure is detected. The host 140 continues to receive lock attention data through the second connection path, preventing the degradation of the performance of a transaction processing system or system failure.

Figure 3:
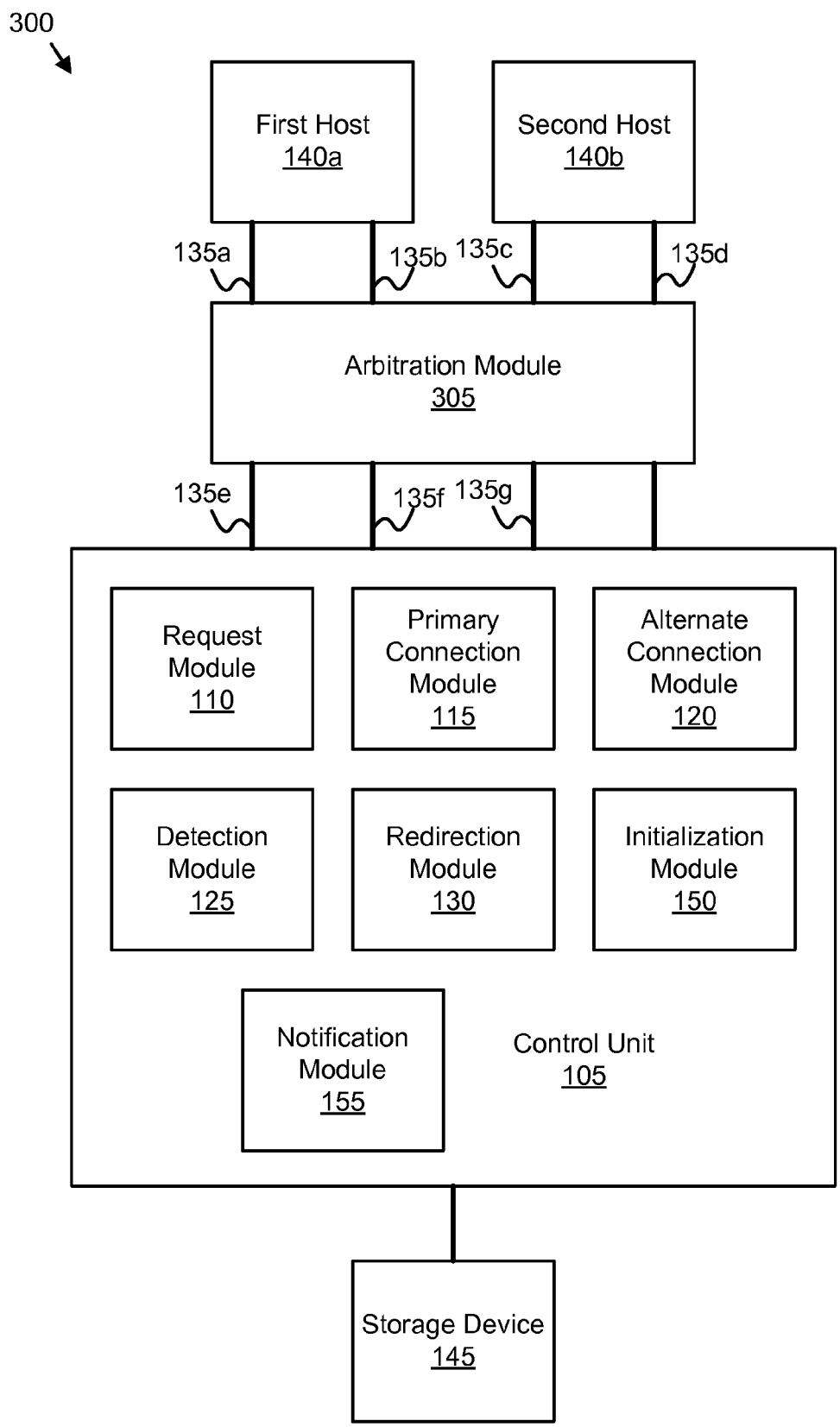
FIG. 3 is a schematic block diagram illustrating one embodiment of a multiple host alternate path system of the present invention.

FIG. 3 is a schematic block diagram illustrating one embodiment of a multiple host alternate path system 300 of the present invention. The system 300 includes one or more hosts 140 communicating through one or more communication channels 135 and an arbitration module 305 with a control unit 105. Each host 140 may access the data of the storage device 145 through the control unit 105. Although the system 300 is depicted with two hosts 140, one arbitration module 305, one control unit 105, and one storage device 145, any number of hosts 140, arbitration modules 305, control units 105, and storage devices 145 may be employed.

The arbitration module 305 arbitrates the communication through each communication channel 135 between the hosts 140 and the control unit 105. In one embodiment, the arbitration module 305 assigns one or more connection paths to a communication channel 135. For example, a first host's 140a connection path may share the second communication channel 135b with a second host's 140b connection path. However, the primary connection module 115 and the alternate connection module 120 will establish the first and second connection paths for each host 140 through two unique communication channels 135.

For example, the first host 140a may communicate with the control unit 105 through a first connection path comprising the first communication channel 135a and the fifth communication channel 135e. In addition, the first host 140a may communicate with the control unit 105 through a second connection path comprising the second communication channel 135b and the sixth communication channel 135f. The second host 140b may communicate with the control unit 105 through a third connection path comprising the third communication channel 135c and the sixth communication channel 135f as well as a fourth connection path comprising the fourth communication channel 135d and the seventh communication channel 135g.

If the detection module 125 detects a failure of the first connection path, the redirection module 130 directs communications including lock attention data from the control unit 105 to the first host 140a through the second connection path. The arbitration module 305 arbitrates communications through the third and sixth communication channels 135c, 135f between the second connection path of the first host 140a and the third connection path of the second host 140b. The first host 140a continues to receive the lock attention data through the second connection path. Thus the first host 140a will access any locked data and release the locked data so that, for example, the second host 140b may request a lock on the data, receive the lock attention data including a holder notification granting the second host 140b a lock on the data, and allowing the second host 140b to access the data in a timely manner.

Figure 4:
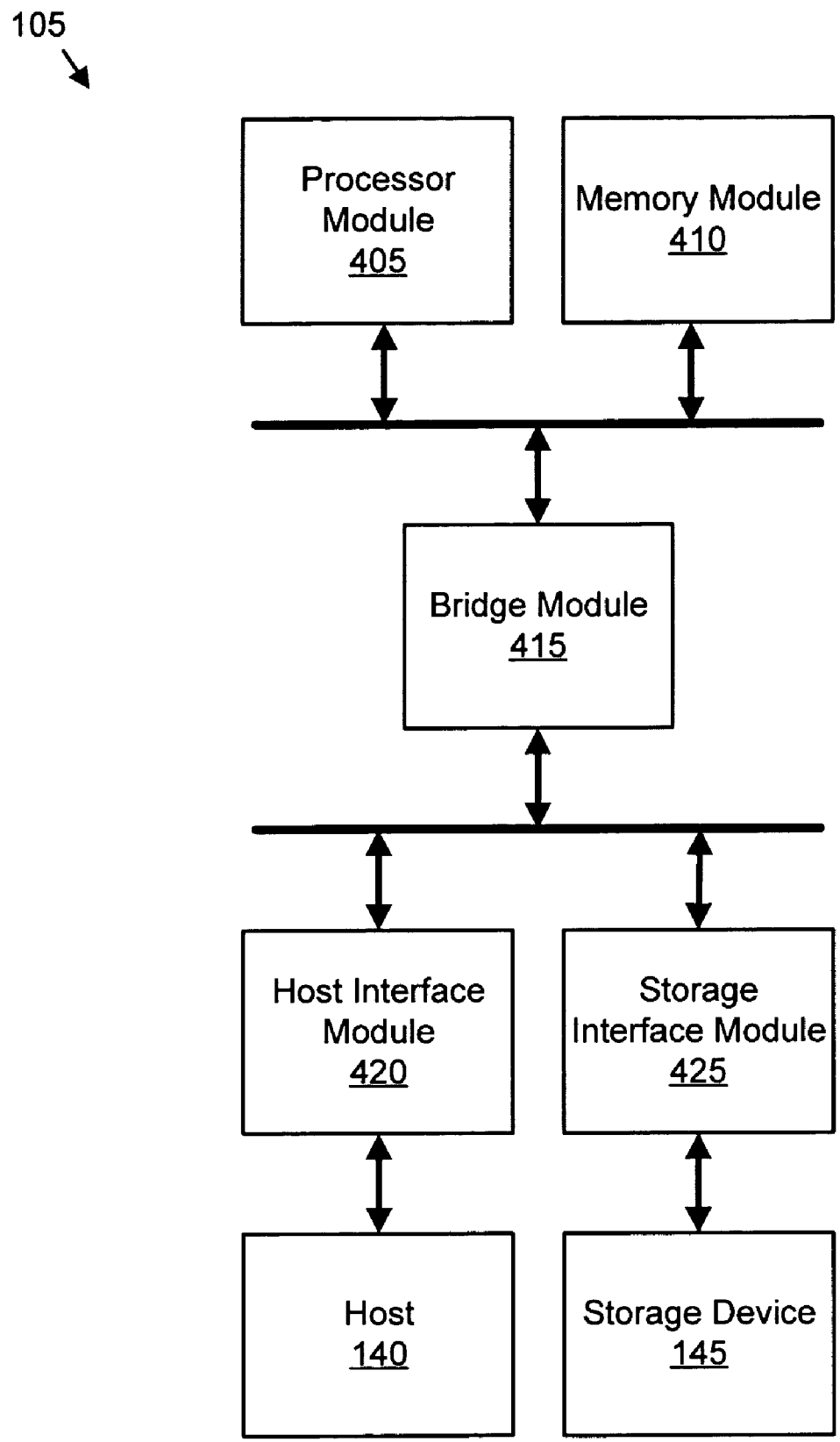
FIG. 4 is a schematic block diagram illustrating one embodiment of a control unit of the present invention.

FIG. 4 is a schematic block diagram illustrating one embodiment of a control unit 105 of the present invention. The control unit 105 includes a processor module 405, a memory module 410, a bridge module 415, a host interface module 420, and a storage interface module 425, a host 140, and a storage device 145.

The processor module 405, memory module 410, bridge module 415, host interface module 420, and storage interface module 425 may be fabricated of semiconductor gates on one or more semiconductor substrates. Each semiconductor substrate may be packaged in one or more semiconductor devices mounted on circuit cards. Connections between the processor module 405, the memory module 410, the bridge module 415, the host interface module 420, and the storage interface module 425 may be through semiconductor metal layers, substrate to substrate wiring, or circuit card traces or wires connecting the semiconductor devices.

The memory module 410 stores software instructions and data. The processor module 405 executes the software instructions and manipulates the data as is well know to those skilled in the art. The processor module 405 communicates with the host interface module 420 and the storage interface module 425 through the bridge module 415.

In one embodiment, the request module 110, the primary connection module 115, the secondary connection module 120, the detection module 125, the redirection module 130, the initialization module 150, and the notification module 155 are software programs comprising software instruction and data executing on the processor module 405.

For example, the processor module 405 executing the request module 110 may receive a connection request to establish redundant connection paths between the control unit 105 and the host 140. In addition, the processor module 405 executing the primary connection module 115 and the alternate connection module 120 may establish a first connection path between the control unit 105 and the host 140 through the host interface module 420 and the first communication channel 135a and a second connection path between the control unit 105 and the host 140 through the host interface module 420 and the second communication channel 135b.

In one embodiment, the processor module 405 executing the detection module 125 detects a failure of the first connection path. The processor module 405 executing the redirection module 130 may redirect communication between the control unit 105 and the host 140 through the second connection path if the first connection path failure is detected.

In one embodiment, the processor module 405 executing the notification module 155 may notify the host 140 that the lock attention data will be communicated through the second connection path by transmitting a message through the host interface module 420 to the host 140. The processor module 405 may also retrieve data from and store data to the storage device 145 through the storage interface module 425.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown.

Figure 5:
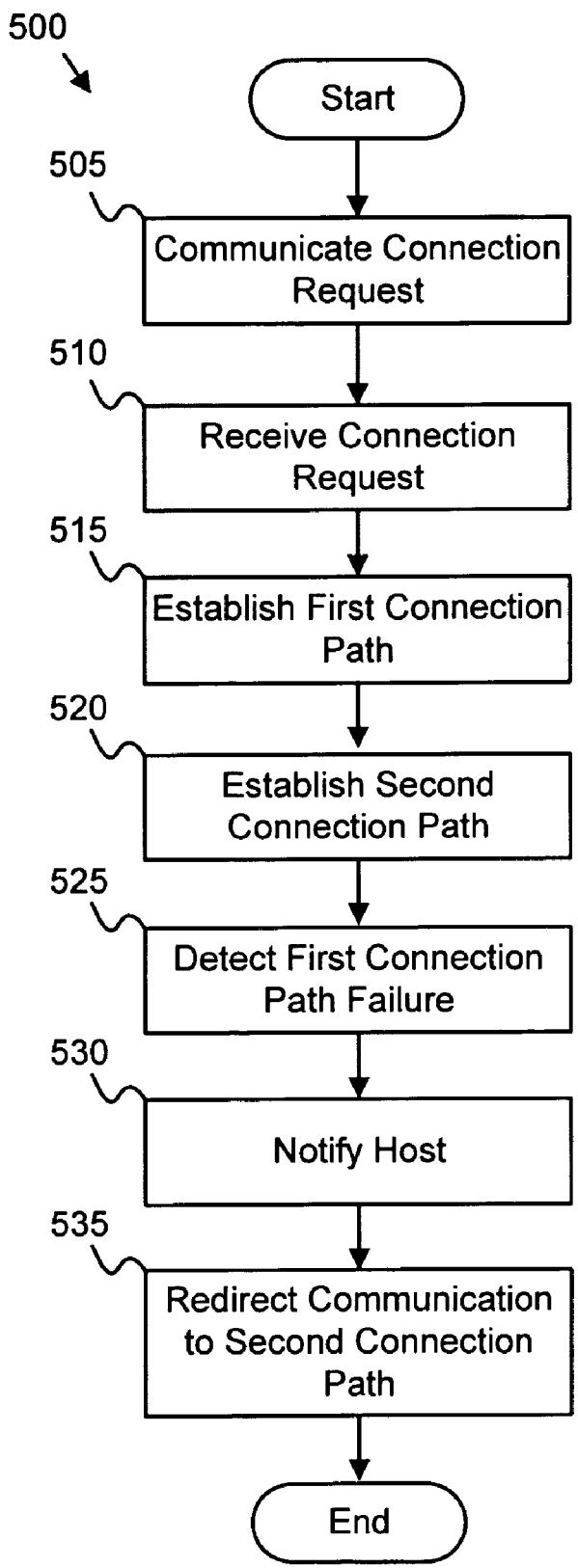
FIG. 5 is a schematic flow chart diagram illustrating one embodiment of an alternate path method in accordance with the present invention.

FIG. 5 is a schematic flow chart diagram illustrating one embodiment of an alternate path method 500 of the present invention. In one embodiment, an initialization module 150 communicates 505 a connection request to establish redundant connection paths between a control unit 105 and a host 140. The initialization module 150 may communicate 505 the connection request when the host 140 is initialized. In an alternate embodiment, the initialization module 150 communicates 505 the connection request if the control unit 105 is initialized.

A request module 110 receives 510 the connection request. The request module 110 may listen at a specified port to receive 510 the connection request. In one embodiment, the connection request comprises a data field identifying the connection request. The connection request may also comprise one or more additional data fields identifying a host 140, data in one or more storage devices 145, or the like.

A primary connection module 115 establishes 515 a first connection path between the control unit 105 and the host 140 through a first communication channel 135a. In one embodiment, the primary connection module 115 requests the first communication channel 135a from an arbitration module 305 to establish 515 the first connection path. In an alternate embodiment, the connection request comprises an identifier for the first communication channel 135a, wherein the first communication channel 135a is assigned to the host 140. In addition, the primary connection module 115 may define one or more ports, control blocks, addresses, and the like to facilitate communication between the host 140 and the control unit 105.

An alternate connection module 120 establishes 520 a second connection path between the control unit 105 and the host 140 through a second communication channel 135b. The alternate connection module 120 may employ one or more software programs shared with the primary connection module 115 to establish 520 the second connection path. For example, the shared software programs may establish 520 the second communication channel 135b and the one or more ports, control blocks, addresses, and the like of the second connection path. In an alternate embodiment, the connection request comprises an identifier for the second communication channel 135b wherein the second communication channel 135b is assigned to the host 140

A detection module 125 detects 525 a failure of the first connection path. In one embodiment, the detection module 125 detects 525 the failure when a specified handshaking signal configured to manage the transmission of messages through the first connection path is not received before a specified timeout period expires. For example, the detection module 125 may detect 525 the failure if the specified handshaking signal is not received within two seconds.

In one embodiment, a notification module 155 notifies 530 the host 140 that the control unit 105 will communicate messages such as lock attention data through the second connection path. The notification module 155 may notify 530 the host 140 by communicating a message comprising a data field with an identifier for the second connection path and a data field indicating the change of communication sources.

A redirection module 530 redirects 535 communications between the control unit 105 and the host 140 through the second connection path if the first connection path failure is detected. In one embodiment, the redirection module 530 directs communications from the control unit 105 to the host 140 through the first connection path. When the failure of the first connection path is detected 525 by the detection module 125, the redirection module 530 redirects 535 communications including the lock attention data from the control unit 105 to the host 140 through the second connection path. In an alternate embodiment, the redirection module 530 directs the control unit 105 to redirect 535 communications to the host 140 through the second connection path. The method 500 establishes 515, 520 redundant first and second connection paths and redirects 535 communications that would be transmitted through the first connection path through the second connection path if the first connection path fails.

Figure 6:
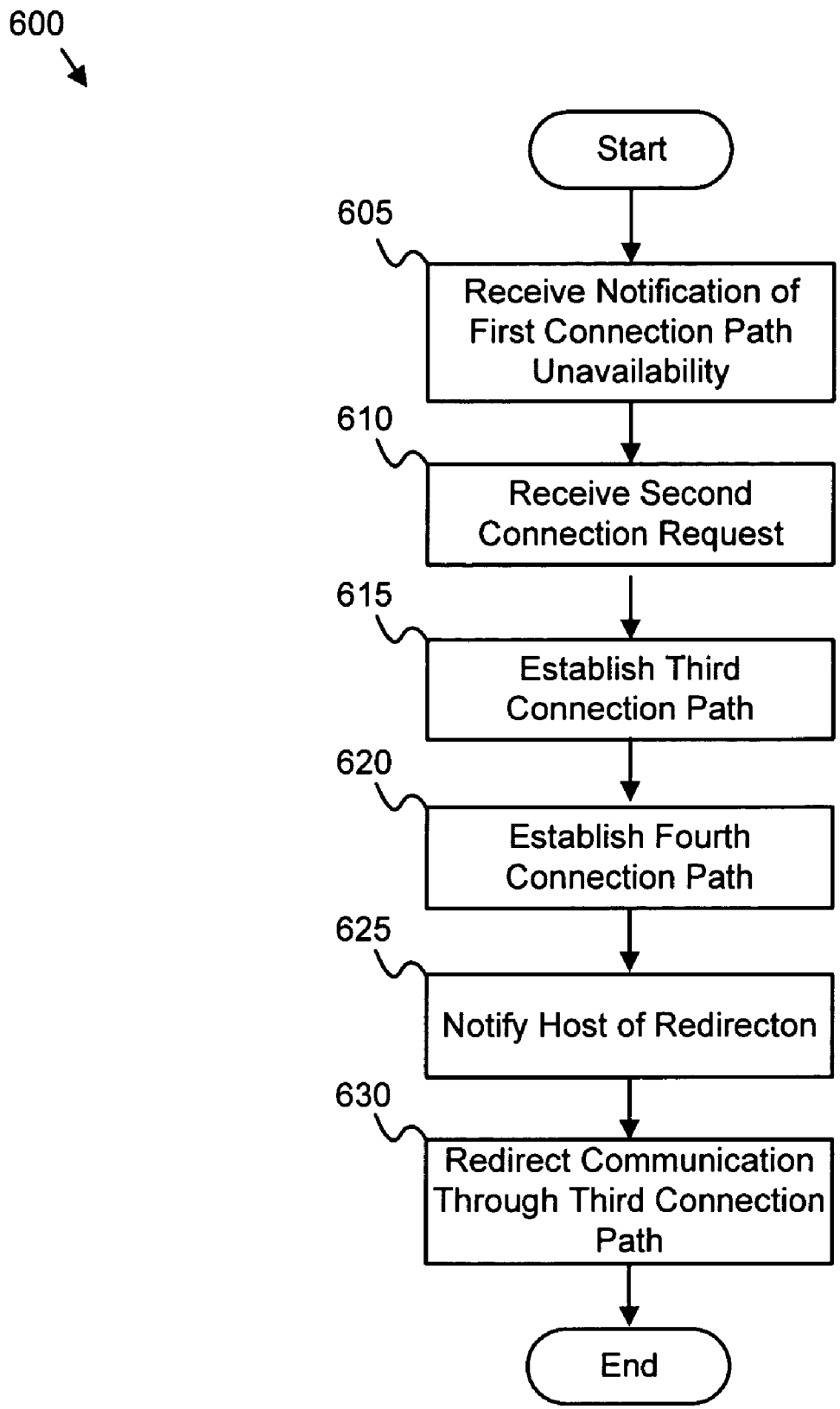
FIG. 6 is a schematic flow chart diagram illustrating one embodiment of a path switching method of the present invention.

FIG. 6 is a schematic flow chart diagram illustrating one embodiment of a path switching method 600 of the present invention. A host 140 receives 605 a notification that a first communication channel 135a will be unavailable. For example, an arbitration module 305 or the like may notify the host 140 that the first communication channel 135a will be unavailable, terminating a first connection path comprising the first communication channel 135a. The host 140 may also have a second connection path from the control unit 105 to the host 140 through a second communication channel 135b. The host 140 transmits and the request module 110 receives 610 a second connection request for the establishment of a replacement connection path.

A primary connection module 115 establishes 615 a third connection path between the control unit 105 and the host 140. In one embodiment, the primary connection module 115 establishes 615 the second connection path as the third connection path. In an alternate embodiment, the primary connection module 115 establishes 615 the third connection path through a third communication channel.

An alternate connection module 120 establishes 620 a fourth connection path between the control unit 105 and the host 140. The alternate connection module 120 may establish 620 the fourth connection path through a fourth communication path or establish the second connection path as the fourth connection path. A notification module 155 notifies 625 the host 140 that communications will be redirected through the third connection path. In addition, a redirection module 130 redirects 630 the communications including lock attention data through the third connection path. The method 600 redirects 630 communications from a first connection path with an alternate second connection path to a third connection path with an alternate fourth connection path, maintaining redundant connection paths for communications between the control unit 105 and the host 140.

Figure 7:
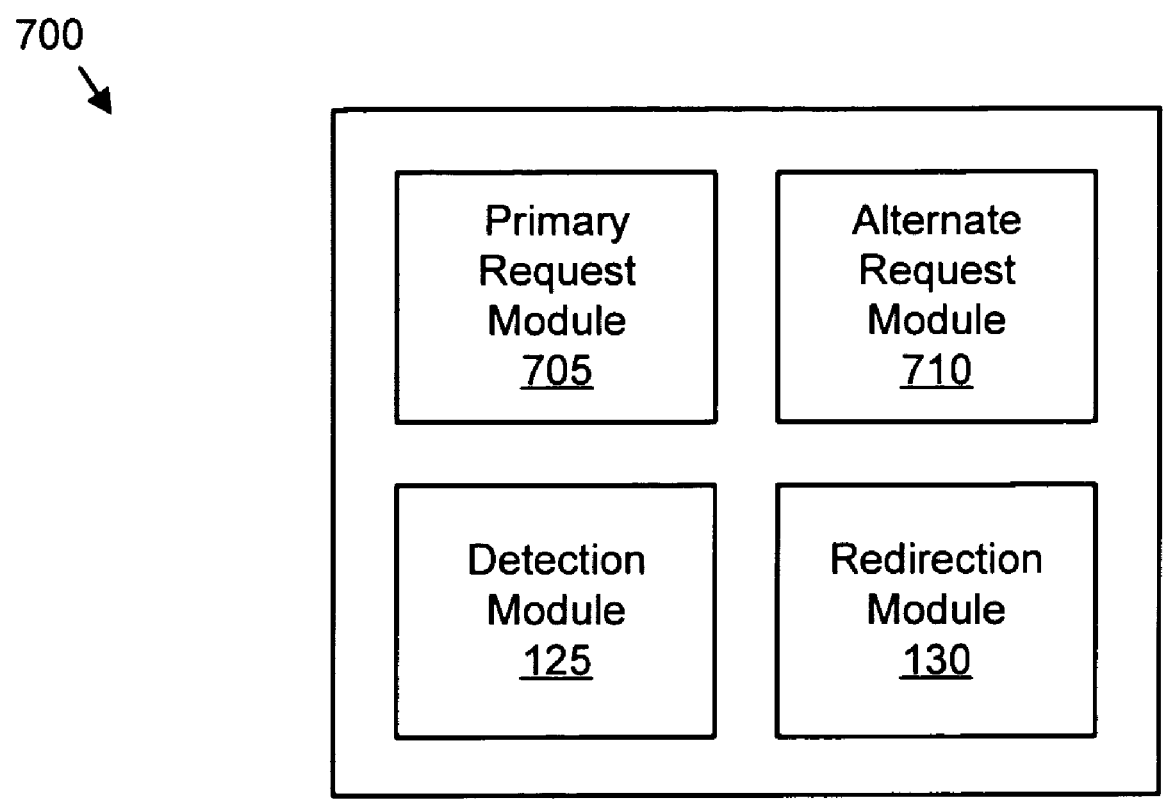
FIG. 7 is a schematic block diagram illustrating one embodiment of a host-based alternate path apparatus of the present invention.

FIG. 7 is a schematic block diagram illustrating one embodiment of a host-based alternate path apparatus 700 of the present invention. The a primary request module 705, an alternate request module 710, a detection module 125, and a redirection module 130. The primary request module 705, alternate request module 710, detection module 125, and redirection module 130 may comprise one or more software programs executing on one or more hosts 140 of FIG. 3.

The primary request module 705 communicates a connection request to a control unit 105 to establish a first connection path between the control unit 105 and the host 140 through a first communication channel 135a. The alternate request module 710 communicates a second connection request to the control unit 105 to establish a second connection path between the control unit 105 and the host 140 through the second communication channel 135b.

The detection module 125 detects a failure of the first connection path. The redirection module 130 redirects communication between the control unit 105 and the host 140 through the second connection path if the first connection path failure is detected. In one embodiment, the redirection module 130 directs the control unit 105 to communicate through the second connection path. In a certain embodiment, the redirection module 130 also directs the control unit 105 to retransmit communications such as lock attention data sent to the host 140 within a specified time interval.

The present invention is the first to establish 515, 520 redundant first and second connection paths between a control unit 105 and a host 140 for communicating lock attention data, with each connection path employing a unique communication channel 135. The present invention also detects 525 a failure of the first connection path and redirects 535 communications through the second connection path, reducing the performance degradation of a system resulting from the host 140 not receiving the lock attention data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for an alternate connection path, the apparatus comprising:
    a request module configured to receive a first connection request to establish redundant connection paths between a first host and a control unit that controls a storage device containing data accessible by a plurality of hosts;
    a primary connection module configured to establish a first connection path communicating lock attention data between the control unit and the first host through a first communication channel;
    an alternate connection module configured to establish a second connection path communicating lock attention data between the control unit and the first host through a second communication channel;
    a detection module configured to detect a failure of the first connection path;
    a redirection module configured to redirect communication between the control unit and the first host through the second connection path responsive to a detection by the detection module of a failure of the first connection path; and
    the request module is further configured to direct the primary connection module to establish a third connection path and to direct the alternate connection module to establish a fourth connection path in response to a second connection request, the third connection path communicating the lock attention data between the control unit and the first host through a third communication channel, and the fourth connection path communicating the lock attention data between the control unit and the first host through a fourth communication channel if the third connection path fails.

2. The apparatus of claim 1, wherein the lock attention data comprises a holder notification configured to notify the first host that the first host holds a lock on specified data on the storage device.

3. The apparatus of claim 1, further comprising an initialization module configured to communicate the first connection request to the request module when the first host is initialized.

4. The apparatus of claim 1, further comprising an initialization module configured to communicate the first connection request to the request module when the control unit is initialized.

5. The apparatus of claim 1, further comprising a notification module configured to notify the first host that the lock attention data is communicated through the second connection path.

6. The apparatus of claim 5, wherein the notification module is further configured to notify the first host that the first connection path must be re-established.

7. The apparatus of claim 1, wherein the first host issues the second connection request to the request module in response to receiving notification that the first connection path will be unavailable.

8. A system for an alternate connection path, the system comprising:
    a plurality of hosts;
    a plurality of communication channels;
    a storage device configured with data accessible by the plurality of hosts;
    a control unit configured to control the storage device the control unit comprising:
        a request module configured to receive a first connection request to establish redundant connection paths between a first host and the control unit;
        a primary connection module configured to establish a first connection path to communicate lock attention data between the control unit and the first host through a first communication channel;
        an alternate connection module configured to establish a second connection path to communicate the lock attention data between the control unit and the first host through a second communication channel;
        a detection module configured to detect a failure of the first connection path;
        a redirection module configured to redirect the communication between the control unit and the first host through the second connection path upon a diction by the detection module of a failure of the first connection path; and
    the request module is further configured to direct the primary connection module to establish a third connection path and the alternate connection module to establish a fourth connection path in response to a second connection request, the third connection path configured to communicate the lock attention data between the control unit and the first host through a third communication channel and the fourth connection path configured to communicate the lock attention data between the control unit and the first host through a fourth communication channel if the third connection path fails.

9. The system of claim 8, wherein the lock attention data comprises a holder notification configured to notify the first host that the first host holds a lock on specified data on the storage device.

10. The system of claim 8, further comprising an initialization module configured to communicate the first connection request to the request module when the first host is initialized.

11. The system of claim 8, further comprising an initialization module configured to communicate the first connection request to the request module when the control unit is initialized.

12. The system of claim 8, further comprising a notification module configured to notify the first host that the lock attention data is communicated through the second connection path.

13. The system of claim 12, wherein the notification module is further configured to notify the first host that the first connection path must be re-established.

14. The system of claim 8, wherein the first host issues the second connection request to the request module in response to receiving notification that the first connection path will be unavailable.

15. The system of claim 8, further comprising an arbitration module configured to arbitrate the communications through the first communication channel and the second communication channel between the first host and a second host.

16. A program of code stored on a storage device and executable by a processor to perform operations for an alternate connection path, the operations comprising:
    receiving a first connection request to establish redundant connection paths between a first host and a control unit that controls a storage device configured with data accessible by a plurality of hosts;
    establishing a first connection path to communicate lock attention data between the control unit and the first host through a first communication channel;
    establishing a second connection path to communicate the lock attention data between the control unit and the first host through a second communication channel;
    detecting a failure of the first connection path;
    redirecting the communication between the control unit and the first host through the second connection path if the first connection path failure is detected; and
    establishing a third connection path and a fourth connection path in response to a second connection request, the third connection path configured to communicate the lock attention data between the control unit and the first host through a third communication channel and the fourth connection path configured to communicate the lock attention data between the control unit and the first host through a fourth communication channel if the third connection path fails.

17. The program of claim 16, wherein the lock attention data comprises a holder notification that notifies the first host that the first host holds a lock on specified data on the storage device.

18. The program of claim 16, wherein the code further comprises operations to communicate the first connection request when the first host is initialized.

19. The program of claim 16, wherein the code further comprises operations to communicate the first connection request when the control unit is initialized.

20. The program of claim 16, wherein the code further comprises operations to arbitrate the communications through the first communication channel and the second communication channel between the first host and a second host.

21. The program of claim 16, wherein the code further comprises operations to notify the first host that the lock attention data is communicated through the second connection path.

22. The program of claim 21, wherein the code further comprises operations to notify the first host that the first connection path must be re-established.

23. The program of claim 16, wherein the code further comprises operations to issue the second connection request in response to receiving notification that the first connection path will be unavailable.

24. A method for deploying computer infrastructure, comprising integrating computer-readable code into a computing system, wherein the code in combination with the computing system performs the following:
    receiving a connection request to establish redundant connection paths between a first host and a control unit that controls a storage device configured with data accessible by a plurality of hosts;
    establishing a first connection path to communicate lock attention data comprising a holder notification configured to notify the first host that first host holds the lock to specified data on the storage device between the control unit and the first host through a first communication channel;
    establishing a second connection path to communicate the lock attention data between the control unit and the first host through a second communication channel;
    detecting a failure of the first connection path;
    redirecting the communication between the control unit and the first host through the second connection path if the first connection path failure is detected; and
    establishing a third connection path and a fourth connection path in response to a second connection request, the third connection path configured to communicate the lock attention data between the control unit and the first host through a third communication channel and the fourth connection path configured to communicate the lock attention data between the control unit and the first host through a fourth communication channel if the third connection path fails.

25. The method of claim 24, wherein the method comprises communicating the connection request when the host or the control unit is initialized.

26. An apparatus to manage an alternate connection path, the apparatus comprising:
    means for receiving a connection request to establish redundant connection paths between a first host and a control unit that controls a storage device configured with data accessible by a plurality of hosts;
    means for establishing a first connection path to communicate lock attention data between the control unit and the first host through a first communication channel;
    means for establishing a second connection path to communicate the lock attention data between the control unit and the first host through a second communication channel;
    means for detecting a failure of the first connection path;
    means for redirecting the communication between the control unit and the first host through the second connection path if the first connection path failure is detected; and
    the receiving means further configured to direct the first connection means to establish a third connection path and to direct the second connection means to establish a fourth connection path in response to a second connection request, the third connection path communicating the lock attention data between the control unit and the first host through a third communication channel, and the fourth connection path communicating the lock attention data between the control unit and the first host through a fourth communication channel if the third connection path fails.

* * * * *